United States Patent [19]

Michon

[11] Patent Number: 4,689,688
[45] Date of Patent: Aug. 25, 1987

[54] CID IMAGE SENSOR WITH A PREAMPLIFIER FOR EACH SENSING ARRAY ROW

[75] Inventor: Gerald J. Michon, Waterford, N.Y.

[73] Assignee: General Electric Company, Schenectady, N.Y.

[21] Appl. No.: 872,982

[22] Filed: Jun. 11, 1986

[51] Int. Cl.⁴ .............................................. H04N 3/14
[52] U.S. Cl. ............................ 358/213.31; 358/213.29
[58] Field of Search ............ 358/212, 213; 357/30 G, 357/30 H

[56] References Cited

U.S. PATENT DOCUMENTS

| | | | |
|---|---|---|---|
| 3,435,138 | 3/1969 | Borkan | 358/213 |
| 4,011,441 | 3/1977 | Michon et al. | 358/213 |
| 4,079,422 | 3/1978 | Anagnostopoulos | 358/213 |
| 4,240,116 | 12/1980 | Tomlinson, Jr. | 358/213 |
| 4,316,221 | 2/1982 | Swab | 358/213 |
| 4,387,402 | 6/1983 | Lewis | 358/213 |
| 4,434,441 | 2/1984 | Ishizaki et al. | 358/213 |
| 4,471,227 | 9/1984 | d'Ascenzo | 358/212 |
| 4,612,578 | 9/1986 | Breithaupt | 358/212 |

FOREIGN PATENT DOCUMENTS 0054455 11/1981 European Pat. Off. .

Primary Examiner—Gene Z. Rubinson
Assistant Examiner—Stephen Brinich
Attorney, Agent, or Firm—Geoffrey H. Krauss; James C. Davis, Jr.; Marvin Snyder

[57] ABSTRACT

A charge injection device image sensor, having increased sensitivity and dynamic range, uses a two dimensional array of cells having m rows each with n cells arranged in n columns. Peripheral electronics first reset all cells along each of the columns, then sequentially scan each column to generate a row voltage signal before advancing to the next sequential row and repetitively scanning across the cells until all array cells have been raster scanned. A voltage preamplifier is connected to each associated row to amplify the video signal only when the cells along that row are being scanned, and reduces the total capacitance of the row-selection electronics.

12 Claims, 4 Drawing Figures

CID IMAGE SENSOR WITH A PREAMPLIFIER FOR EACH SENSING ARRAY ROW

BACKGROUND OF THE INVENTION

The present invention relates to charge injection device (CID) image sensors and, more particularly, to a novel integrated CID image sensor having an on-chip voltage preamplifier for each row of sensing array cells.

It is well known that the sensitivity of a charge-injection-device (CID) sensor is limited by the signal-to-noise ratio of the device signals. Improved sensitivity, allowing wider dynamic range and concomitant operation in lower incident light levels, requires that the temporal noise level be significantly reduced. The temporal noise in a CID image sensor is typically determined by the Johnson noise of both the row select multiplexer and the video amplifier, and by the capacitance associated with the signal sense line. Present CID image sensors incorporate a current sensing scheme which tends to peak the resulting noise current at a relatively high frequency. Because row selection is accomplished by multiplexing, wherein a multiplexer connects a different one of the row lines to the input of the single video amplifier, the capacitance attributable to the signal line is relatively large. Thus, it would be highly beneficial to reduce the capacitance and/or noise attributes associated with the peripheral selection circuitry, for selecting that one cell of a CID sensing array to provide an output at any particular instant, to reduce the temporal noise level and thus provide increased sensitivity and dynamic range.

BRIEF SUMMARY OF THE INVENTION

In accordance with the invention, a charge injection device (CID) image sensor having increased sensitivity and dynamic range utilizes: a two dimensional array of cells having a plurality m of rows each having a like plurality n of cells arranged in n columns; peripheral means for (a) resetting all cells along the last scanned one of the plurality of rows in the array, and (b) then sequentially scanning each of the cells in the n columns along a next row to be scanned, to generate a row voltage signal responsive to the intensity of photon flux having fallen on that cell after reset, and (c) then repeating parts (a) and (b) for a next sequential row of the array in repetitive raster scans across all of the cells of all of the rows; a plurality m of voltage preamplifier means each having a control electrode coupled directly to an associated row for amplifying the signals therefrom only when the cells along that row are being scanned; and video amplifier means for providing an output video signal responsive to the preamplified signals from the sequentially-scanned cells of the array.

In a presently preferred embodiment, the cells along a pair of adjacent rows are simultaneously scanned, with the previously-read second row of the pair providing a voltage signal related to the fixed pattern noise therein. The video amplifier differentially receives the pair of video signals thus produced, and utilizes delaying means to decrease the fixed pattern noise contribution to the sensor output signal.

Accordingly, it is an object of the present invention to provide a novel charge-injection-device image sensor utilizing a voltage preamplifier for each row of the cells in the sensor array.

This and other objects of the present invention will become apparent upon a reading of the following detailed description, when considered in conjunction with the associated drawings.

DETAILED DESCRIPTION OF THE INVENTION

Figure 1A:
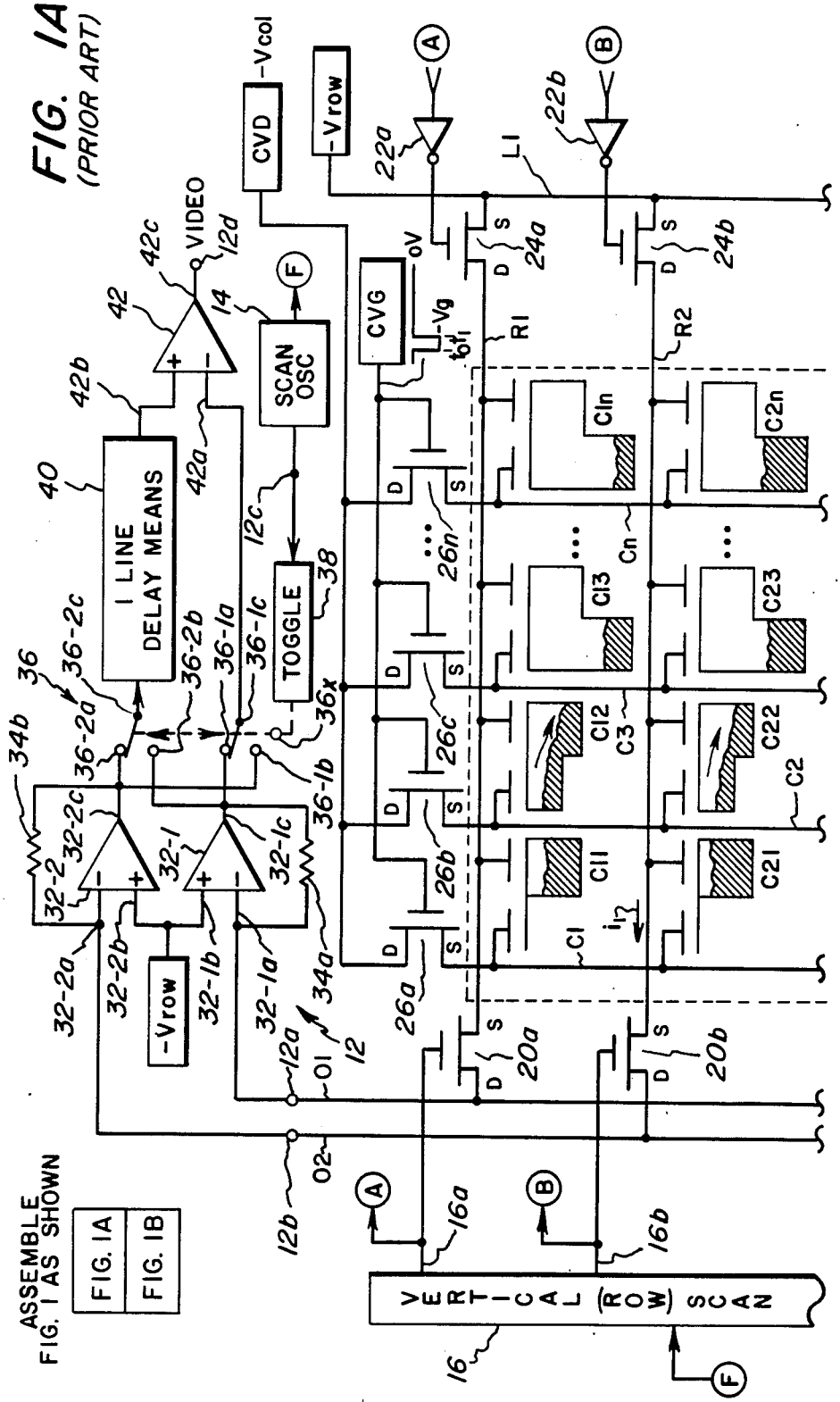
FIG. 1, assembled from FIGS. 1A and 1B, is a schematic diagram of a prior art CID imaging array and peripheral electronics, and is useful in appreciating some of the problems associated therewith.
Figure 1B:
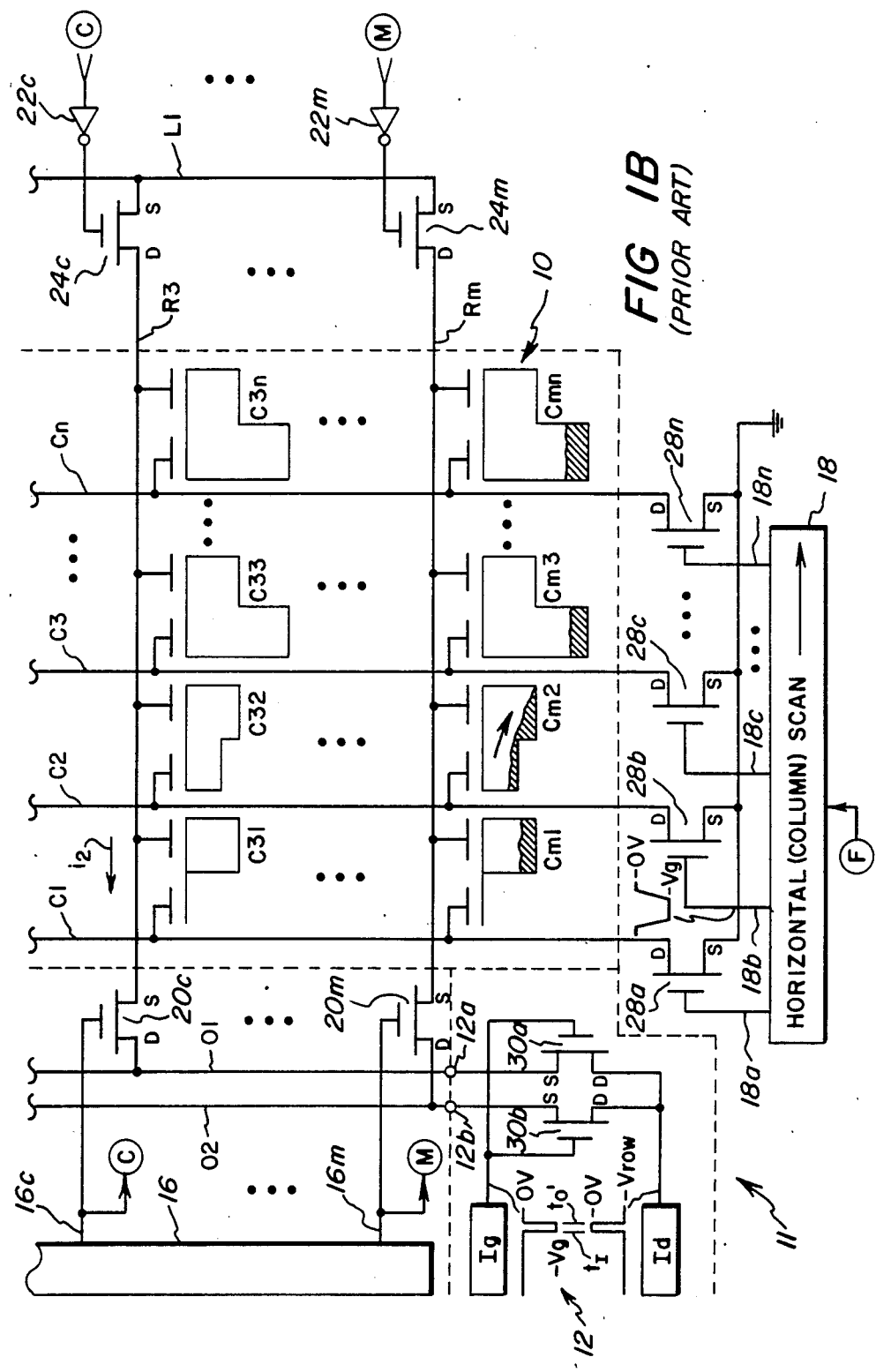

Referring initially to FIG. 1, formed by assembling FIGS. 1A and 1B as shown, a prior art CID imaging array 10 includes a plurality of cells, e.g. a m×n array of cells C11–Cmn. The array 10 is utilized with peripheral electronics means 11 and video amplification means 12. Each of the cells Cmn is, as well known to the CID imaging arts, comprised of a region of a semiconductor member insulatively overlayed with a pair of coupled electrodes; a column electrode, here illustrated as being on the left side of each cell, is connected to one of a plurality n of column lines C1, C2, . . . , Cn, while each of the remaining electrodes, here illustratively the right-hand electrodes, are row electrodes connected to an associated one of a plurality m of row lines R1, R2, . . . , Rm.

Peripheral electronics means 11 includes a scan oscillator means 14 providing a scanning signal (at a known frequency F related to the desired array scan rate) to a vertical (row) scan means 16 and to a horizonal (column) scan means 18. Each of the individually energizable plurality m of scan row outputs 16a–16m is connected to the gate electrode of a like plurality m of first row switching devices 20a–20m, each having its source S electrode connected to the associated one of the row lines R1–Rm. The drain D electrodes of alternating ones of switching devices 20a–20m are connected to alternating ones of a pair of output lines 01 and 02; thus, all of the odd devices 20a, 20c, . . . are connected to the first output line 01 and thence to a first input 12a of the video amplification means 12, while the remaining, even devices 12b, 12d, . . . have their drain D electrodes connected to a second output line 02 and thence to a second video amplification means input 12b. Each of the individually-energizable row scan outputs 16a through 16m have the binary state signals thereof inverted by an associated one of a like plurality m of row scan inversion means 22a–22m. The output of each of inversion means 22 is connected to the gate electrode of an associated one of a like plurality m of second row switching devices 24a–24m. Each of devices 24a–24m has its source S electrode connected to a common line L1 to which is provided a row potential, illustratively, for P-type enhancement-mode FET devices, a voltage of $-V_{row}$. The drain D electrode of each of devices 24a–24m is connected to the associated one of the row lines R1–Rm, in parallel with the source electrode of the associated one of first row switching devices 20a–20m.

Associated with each of the plurality n of column lines C1–Cn is a first column switching device 26a–26n, each having its drain D electrode connected to a column voltage drain (CVD) terminal, for receiving a column potential, e.g., a voltage $-V_{col}$ of the gate electrodes of first column switching devices 26 are connected to a column voltage gate (CVG) terminal. Each individual first column switching device source S electrode is connected to a different associated one of column lines C1–Cn, to which is also connected, in parallel, the drain D electrode of one associated one of another plurality n of second column switching devices 28a–28n, respectively. Each of devices 28a–28n has the source S electrode thereof connected to common potential, and has its gate electrode connected to an individual one of a like plurality n of individually-energizable horizontal (column) scan means outputs 18a–18n.

Video amplification means 12 includes a pair of injection switching devices 30a and 30b, each having its source S electrode connected to one of video amplification input terminals 12a or 12b, respectively. The drain D electrodes of both devices are connected in parallel to an inject drain connection Id while both gate electrodes are connected in parallel to an inject gate terminal Ig. One of terminals 12a or 12b is respectively connected to the non-inverting input 32-1a or 32-2a, respectively, of first and second differential-input amplifier means 32-1 or 32-2, respectively. The non-inverting inputs 32-1b and 32-2b of the two amplifiers are connected in parallel to receive the row potential, e.g. the voltage $-V_{row}$. A transconductance-setting feedback resistor 34a or 34b is connected between the respective input 32-1a or 32-2a and the respective amplifier output 32-1c or 32-2c. A double-pole, double-throw switching means 36 has a first section first selectable terminal 36-1a and a second section second selectable terminal 36-2b each receiving the signal at first video amplifier output 32-1c. The second video amplifier output 32-2c signal is connected to both the first section second selectable terminal 36-1b and second section first selectable terminal 36-2a. The first and second section common terminals 36-1c and 36-2c, respectively, are jointly moved into contact with the first or second selectable terminals of each of the first and second switch sections, responsive to the signal at a switching control input 36x. This signal is supplied by a switch toggling means 38, responsive to the scan oscillator signal received at a video amplifier third input 12c. The first switch section common terminal 36-1c is connected to an inverting input 42a of an output video amplifier means 42, while the second switch portion common terminal 36-2c is connected through a one scan-line delay means 40 to a non-inverting input 42b of the output video amplifier. The output video amplifier output 42c is connected to the imaging sensor video output terminal 12d.

In operation, as is well known to the CID imaging sensor arts, all of the column electrodes are preset to the $-V_{col}$ potential, at the start of each horizontal scan, by pulsing the CVG gate potential from the normal resting potential, e.g. substantially zero volts, to a conduction-enabling potential, e.g. a potential of about $-V_g$ volts, at a column preset commencement time $t_0$, and then returning the gate voltage on devices 26 to substantially the resting (zero) level by a slightly later time $t_1$ at which the horizontal scan actually commences. During the horizontal scan, the amount of photon-induced charge accumulated (since the last charge-injection clearing action) in each of the column potential wells of a designated row, e.g. the second row in the illustrated array, is sequentially read from the array cells along that row, by sequentially enabling the horizontal scan means outputs to sequentially enable one of second column switching devices 28a–28n to a conductive condition. This occurs by pulsing the potential at the gate electrode of the associated device, e.g. device 28b for reading the charge in a second column cell (cell C22, with the second row R2 being activated). When the gate voltage is pulsed from the normal resting, substanially zero voltage to a conduction voltage, e.g. about $-V_g$ volts, a current $i_1$ is caused to flow through the associated row (R2) line and thence into the associated output (02) line through the associated enabled first row switching device 20b (the second row switching device 24b being in the conduction-disabled condition). This total current $i_1$ includes both the signal current and fixed pattern noise current from the desired cell. The last-read row (e.g. row R3) may also be read at the same time, to provide a second current $i_2$ in the other array output line 01, which has only the fixed pattern noise component for that row-column combination (e.g. cell C32). The pair of currents are amplified in one of video amplifier means 32-1 and 32-2. Because of the alternating connection of the first row switching device drain D electrode connections to the output lines, there is a resulting polarity reversal as each successive row is scanned. This polarity reversal of the signals at outputs 32-1c and 32-2c must subsequentially be itself reversed by toggling the reverse switching means 36, at the row-scanning rate (related to the rate F of the cell-scanning signal and the number of cells along each row). The polarity-corrected video signals are so connected such that the video signal from last row scanned is delayed for the duration of one row (or line) scan, by delay means 40. The fixed pattern noise signal current (provided by that row during the scan of the next higher row of the array) is then provided to differential video output amplifier 42 simultaneously with the previous row signal of fixed pattern noise plus signal current, for effective subtraction. After scanning of the entire row, the charge in each of the cells of that row is injected, commencing at a time $t_j$ when the potentials at the current source gate and drain (i.e. potentials at terminals Ig and Id) are temporarily reversed, until a time $t_0$, when the next column preset signals and subsequent horizontal row scan process are ready to commence. (It should be noted that, while the column lines are scanned in forward order, i.e. from first column C1 to n-th column $C_n$, the row lines are scanned in reverse order, i.e. from m-th row line $R_m$ to first row line $R_1$; the cell array is numbered in the conventional manner, i.e. left-to-right and top-to-bottom, even though scanned from bottom-to-top.)

As previously stated hereinabove, the row lines R1–Rm are multiplexed by a real multiplexer, here utilizing devices 20 and 24; this multiplexer causes a relatively large signal line capacitance to be provided at each row line. Reduction of this capacitance is highly desirable, as is any other improvement in signal-to-noise ratio.

Figure 2A:
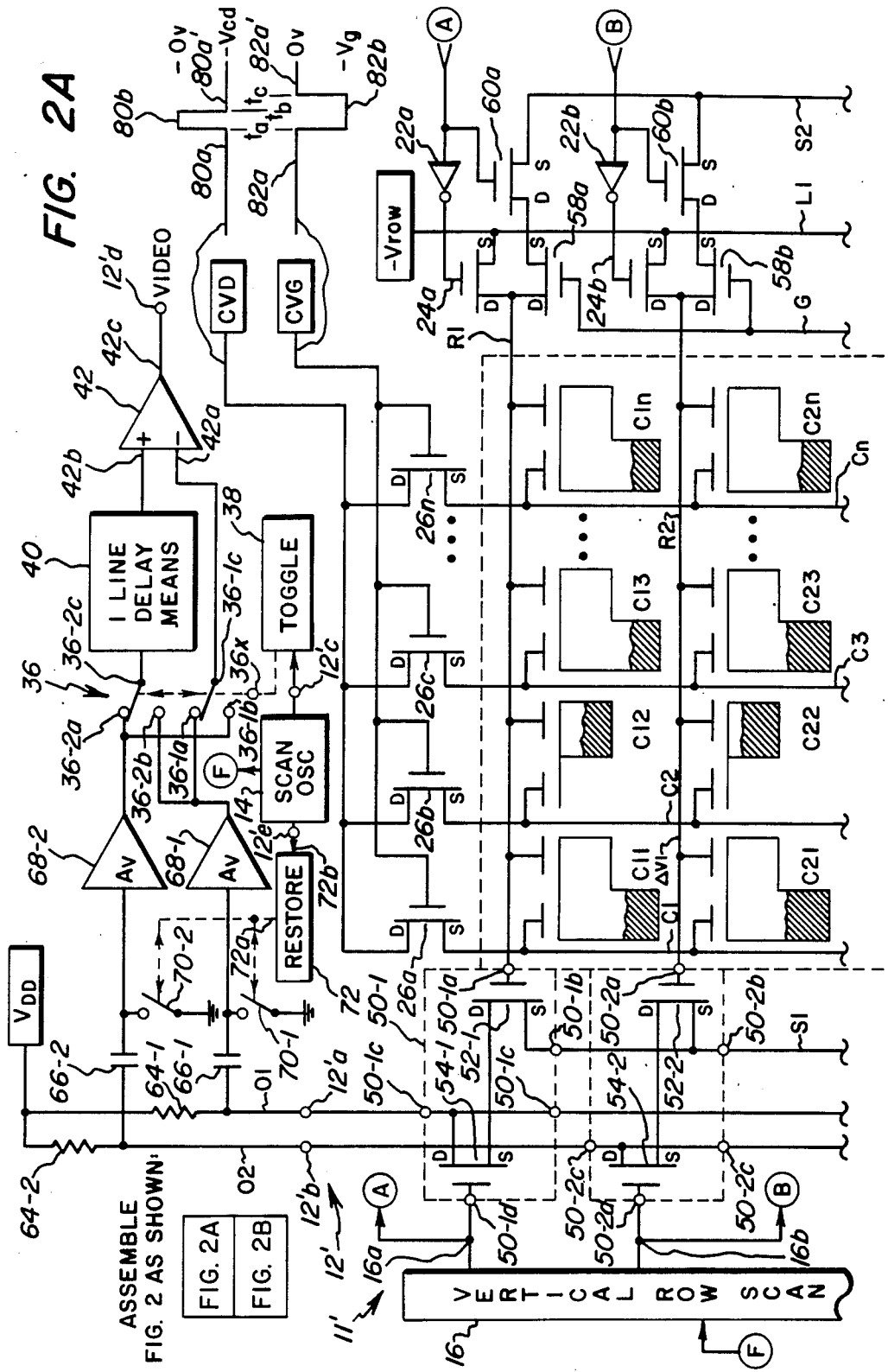
FIG. 2, assembled from the schematic diagrams of FIGS. 2A and 2B, and is a schematic block diagram of a presently preferred embodiment of a CID image sensor of the present invention, having a separate voltage preamplifier for each row of sensing cells in the imaging array.
Figure 2B:
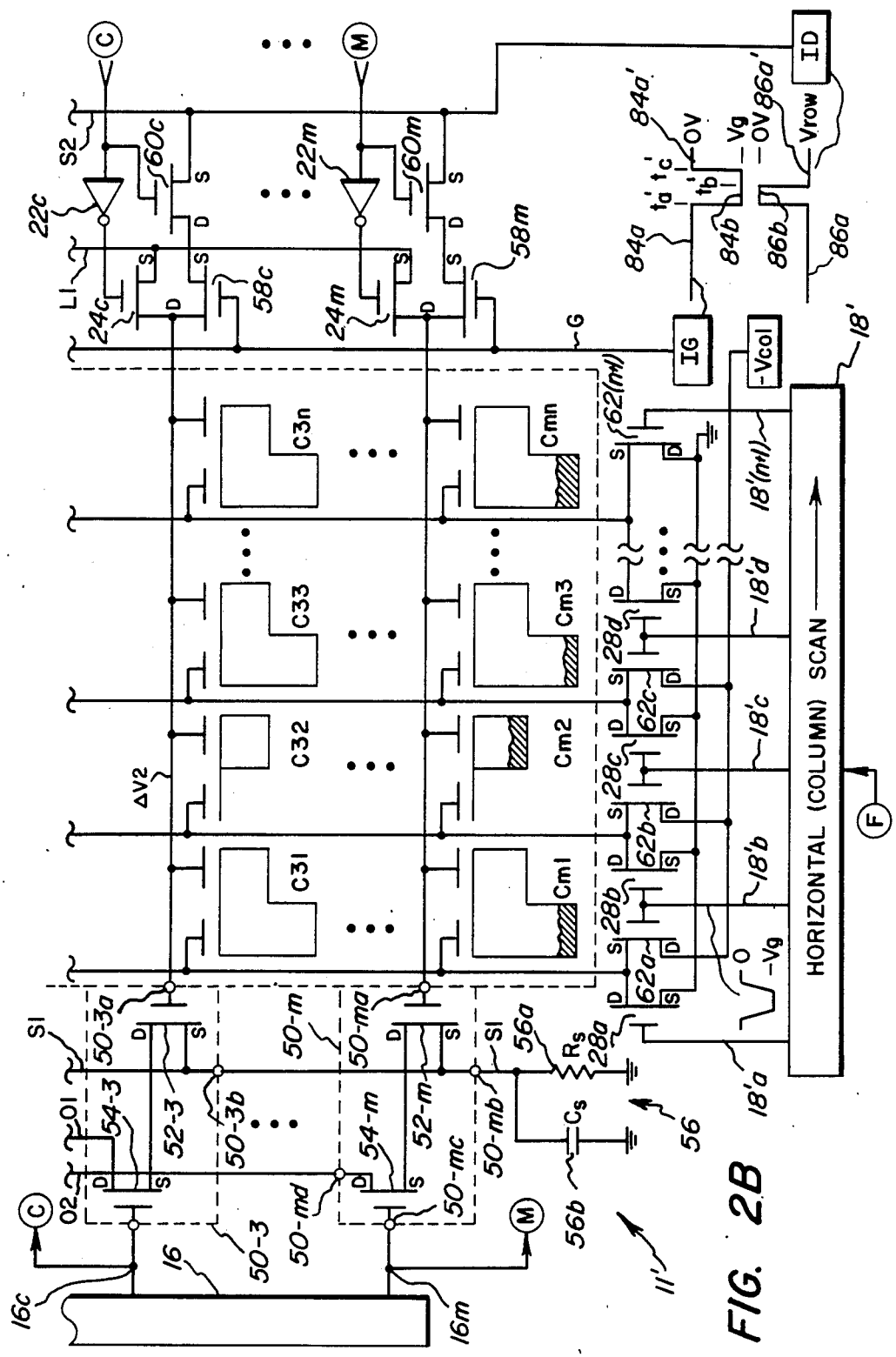

Referring now to FIG. 2, assembled of FIGS. 2A and 2B as shown, my image sensor has a higher sensitivity, and hence a better dynamic range, even though I utilize essentially the same array 10 of photon-responsive charge-storage cells C11–Cmn, as in the prior art sensor. However, my sensor utilizes different and/or additional means within the peripheral scanning electronics means 11' and video amplifier means 12'. The entirety of array 10 and means 11' and 12' can be integrated into a single monolithic integrated circuit, if desired.

Peripheral electronics mean 11' again utilizes a vertical-row scan means 16, which sequentially enables an adjacent pair of row-designating outputs 16a through 16m. Vertical scan output inverters 22a-22m are utilized with row switching devices 24a-24m, as in the original sensor. However, row switching means 20a-20m, (which were also enabled and disabled directly by the row scan means outputs) are not utilized.

In accordance with one aspect of the present invention, each of a plurality m of selectively-enableable row preamplifier means 50-1 through 50-m is associated with one of the m rows of the sensor array. Each of the cascode-connected preamplifier means 50 includes a preamplifier device 52-1 through 52-m and a switchable second device 54-1 through 54-m. Each of the preamplifier devices 52 has a gate electrode connected to an amplifier means input terminal 50-xa, where $1 \leq x \leq m$; input terminal 50-xa is connected to the associated row line Rx. The source electrode of each preamplifier device 52-x is connected to a source bias terminal 50-xb of each amplifier means, for connection in parallel, via a common first source line S1, to a source biasing network 56, comprised of a source resistance 56a, of preselected resistance $R_s$, and a shunting bypass capacitance 56b, of selected value $C_s$. The drain D electrode of each preamplifier device 52-x is coupled to the source S electrode of one associated switchable second device 54-x, which latter device has its gate electrode connected to the gating input 50-xc of that preamplifier means, for connection to the associated one of row scanner means output 16a through 16m. The drain D electrode of the switchable second device of each preamplifier means is connected to an output terminal 50-xd of each preamplifier means, with the output terminals being connected in alternating fashion to an associated one of first output 01 line (to which all of the odd-numbered preamplifier means outputs are connected, and to first video amplifier means input 12'a), or to second output 02 line connected to all of the output terminals of the even-numbered preamplifier means, and also to the second input 12'b of the video amplifier).

In order to provide for row injection and preset, a plurality of first row switching devices 58a-58m are provided, each having their gate electrode connected to a gate G line and an inject-gate IG terminal. Each of first row switching devices 58 have the drain D electrode thereof connected in parallel with the drain D electrode of the second row switching devices 24a-24m for the same row line R1-Rm. The source electrode of each of first row switching devices 58 is connected to the drain electrode of an associated one of a plurality m of third row switching devices 60a-60m. Each of the latter devices has a gate electrode connected to an associated row scan means output 16a-16m, and has a source electrode connected in parallel to a second source S2 line, terminating at an inject-drain ID terminal of the sensor.

The column, or horizontal, scan means 18 has one additional output 18(n+1) more than the horizontal scan means for the array of FIG. 1. Each of the first column switching devices 28a-28n has its drain D electrode also connected to the source S electrode of a like plurality n of third column switching devices 62a-62n, each having its drain D electrode connected to receive the column potential, e.g. the $-V_{col}$ voltage. The gate electrode of each of the third column switching device 62y, where $1 \leq y \leq n$, is connected to the column scan means output 18' (y+1) connected to the gate electrode of the second column switching means for the next-higher column; thus, the last switching device 62n gate electrode is connected to the additional column scanning means output 18' (n+1). Devices 62 cause the last-scanned column line, e.g. line C1, to be reset high, e.g. to zero volts, after each activation, while the next-scanned column line, e.g. line C2, is being activated to the low level, e.g. $-V_g$ volts, by its device 28y to move charges packets (associated with each cell on that column line) under the row electrode of that cell; thus, there is never more than one charge packet under the plurality of row electrodes connected to each row line.

In accordance with another aspect of the invention, the photon-induced charge is sensed as a change in voltage on the row line, rather than a current change in the row line, and the video amplification means 12' utilizes voltage gain and noise-offset means between the video amplification means inputs 12'a and 12'b, and the alternating-line plurality-correction switching means 36. Each of the array output lines 01 and 02 is terminated through an associated load resistance 64-1 or 64-2 to an operating voltage $V_{DD}$ terminal. The signal voltages developed across each of load resistors 64 is coupled, through a coupling capacitor 66-1 or 66-2, to the input of one of a pair of video voltage amplifier means 68-1 or 68-2, each having substantially the same voltage gain $A_v$. The amplifier input can be temporarily connected to circuit common potential through an associated one of restoration switching means 70-1 or 70-2, responsive to a selected binary state of a signal at an output 72a of a restore means 72. Restore means 72 operates, at the start of each horizontal scan cycle, to remove kTC noise and row offset potentials, responsive to a like feature of each of a periodical multiplicity of scan cycle waveforms provided at the control input 72b of the restore means, from a terminal 12' a receiving a control signal from the master scan oscillator means 14.

In operation, restore means 72 operates once at the start of each horizontal scanning cycle to close switch means 70-1 and 70-2 to remove row offset and kTC noise voltages at the inputs of the two voltage amplifiers 68-1 and 68-2. Simultaneously, means (not shown) provide the gate and drain column voltage terminals CVG and CVD with scan-commencement signals, and also provide the row switching means terminals IG and ID with other scan-commencement signals. Thus, prior to a time $t_a$, the previous horizontal scan is ending and the CVD potential is, in a first portion 80a, at a voltage of about $-V_{col}$, while the CVG potential is at a substantially zero level, in portion 82a; the IG potential is also at substantially zero volts, shown at portion 84a, while the ID terminal receives a substantial negative potential, in portion 68a, e.g. about $-V_{row}$. At time $t_a$, the last-scanned row of array 10 is cleared by injecting the charge in all of the plurality n of cells along that row. All of the left-hand column electrodes are simultaneously provided with a substantially zero column-injection umn-injection potential, by providing the CVD terminal with a substantially zero voltage, at waveform portion 80b, while the CVG waveform portion 82b simultaneously provides a negative potential, e.g. about $-V_g$ volts, to cause all of first column switching devices 26a-26n to conduct and place the substantially zero drain column voltage upon each column electrode. Simultaneously, the IG waveform provides a portion 84b at the substantial negative potential, e.g. $-V_g$ volts, to the gate electrode of each of row switching devices 58a–58m; the potential at terminal ID rises, as shown at portion 86b, to substantially zero volts, on line S2. All but one of the row scan means outputs 16a–16m are at a substantially logic zero level; only the output for the last-scanned row, e.g. output 16c for row R3, is (still) at a logic one level. Series-connected devices 58d/60d conduct and couple the associated row line, e.g. row line R3, to substanially zero volts. Thus, in the time interval between time $t_a$ and time $t_b$ (at which latter time the CVD and ID potentials fall back to their negative non-zero values) each of the column and row electrodes in each cell along the last-scanned row of the array is at substantially a zero potential, injecting the cell charge into the array substrate. The cleared row cells are now preset, when all of the column electrodes are provided with a presetting column potential, e.g. the $-V_{col}$ voltage, in the time interval between time $t_b$ and time $t_c$, responsive to the CVD potential falling (to the $-V_{COL}$ level in portion 80a') while the CVG potential remains at the low level of portion 82b. Simultaneously, the IG potential remains at its low level, in portion 84b, but the row voltage falls, in portion 86a', to its low $-V_{row}$ value, to preset the row electrodes. Thereafter, at time $t_c$, the gate potentials at the CVG and IG terminals fall to their substantially zero values, in portions 82a' and 84a', respectively, and remain there for the rest of the horizonal scan.

Each of the cleared and preconditioned empty cells, e.g. cells C31, C32, C33, ..., C3n along row line R3, are now ready for storage for photon-induced charge, as the potential well under the column (left-hand) electrode is again deeper then the potential well under the row (right-hand) electrode. The vertical scan means output for the next row to be scanned, e. g. output 16b for row R2, is energized to the logic 1 level at time $t_c$; the last-scanned line output, e.g. output 16c, is maintained high for the next-subsequent row scan. The magnitude of stored charge is read from the cells along both now-enabled rows (last-scanned row R3 and present-scanning row R2) on a cell-by-cell basis. Though not the only form of array scan, the reading process is here illustrated by assuming a raster scan, wherein each of the plurality n of cells along a particular row is scanned before the sequential line of cells along a next one of the plurality m of rows is subsequently scanned, with the entire cell array being scanned and re-scanned in order.

Assume that the R3 row has already been scanned (with the cell-by-cell read-out data now traveling through delay means 40) and that the row scan means 16 has now enabled output 16b for scanning of the next-higher row, i.e. those cells having their right hand row electrode attached to the R2 row line. As a differential read-out scheme is again utilized to remove fixed-pattern noise, the row scan means outputs for both the line being read out and the next lowest line (lines R2 and R3, and outputs 16b and 16c, in the illustration) are enabled to the logic one condition, e.g. to a potential of $-V_g$ volts. The remaining row scan means outputs 16a, 16d, ..., 16m are all in the logic zero (substantially zero volt) level. Thus, the cascode second stage switching transistors 54-1 and 54-4 through 54-m are all in the cut-off condition, while the second and third row condition, connecting the drain D electrodes of preamplifier transistors 52-2 or 52-3, respectively, to the second output 02 line or the first output 01 line, respectively. Row switching devices 60a and 60d through 60m all receive a substantially zero voltage at their gate electrodes and are in the cut-off condition, while the second or third row switching devices 60b and 60c are in the conductive condition. However, all of devices 58a through 58m are in the cut-off condition, whereby current does not flow through any of the series-connected pair of devices 58-60 for any row. Simultaneously, the devices 24a and 24d–24m for the non-selected first and third through m-th rows, are conducting connecting the first row line R1 and the fourth through m-th row lines R4 through Rm to the row presetting potential ($-V_{row}$ volts). Row switching devices 24b and 24c are, however, in the cut-off condition, so that the voltage on row lines R2 and R3 are determined only by the transfer of charge in the underlying potential wells along each of these rows.

The charge in cell C21 and injected cell C31 are read, as respective voltage $\Delta V1$ and $\Delta V2$ on respective lines R2 and R3, when first column C1 line was previously enabled by the pulsing of column scan means first output 18' a to a logic one condition (a negative $-V_g$ voltage); this column line is now disabled. The second column output 18'b of the column scan means is now enabled to the $-V_g$ level, while the remaining scan means outputs 18'a and 18'c through 18' (n+1) are all at the logic zero level (substantially zero volts). Responsive to these column scan means outputs, column switching means 28b is in the conductive condition, so that second column line C2 provides a substantially zero potential on all of the left hand electrodes, causing any charge in a column potential well along this particularly (second) column to be transferred into the associated row potential well. All of the other devices 28a and 28c–28n are in the cut-off condition. Simultaneously, the reverse-connected associated devices 62 are biased in the following manner: those devices 62b–62n receiving the logic zero levels are in the cut-off condition; while the device, (e.g. device 62a) associated with the column (e.g. the first column) prior to the column (e.g the second column) now being read, is placed in the conductive condition, connecting the prior (first) column line (C1) to the presetting potential, e.g. $-V_{col}$ volts, to pull the charge under the row electrode of the previously read cell, e.g. cell C32, back under the column electrode of that cell. Also responsive to these signals, the charge previously stored in the column well of cell C22 is then transferred into the row well of that cell and causes a change $\Delta V1$ in the second row line R2 voltage. At the same time, any fixed pattern noise charge in the cell in the same column but in the previously-read row (e.g. cell C32) is transferred from the column well to the row well of that cell, as is any charge that flows through the column-row crossover capacitance, of that cell and provides a change $\Delta V2$ in the previous row voltage. Thus, the charge transfer is read out as a change in row voltage, rather than in row current as in the prior art sensor of FIG. 1. This use of voltage sensing provides an additional reduction in output noise level (of about two times) when compared with the current sensing scheme of the previous sensor. In addition, the voltage appears only across the input capacitance of the associated row preamplifier transistor, e.g. second row preamplifier transistor 52-2 or third row preamplifier transistor 52-3. Since these input capacitances are much less than the capacitance of the multiplexer of the prior art sensor of FIG. 1, it will be seen that the present sensor, utilizing a voltage preamplifier permanently connected and operating with each different row of the array, and switched to have the output thereof connected to one of the array output lines, provides a considerably decreased capacitance at the output line. This reduced capacitance gives a directly proportional increase in signal voltage and hence in signal-to noise ratio. The resulting flat (white) noise spectral density (rather than the peaked pink noise density of the prior sensor) allows the voltage sensing improvement to also increase the signal-to-noise ratio, thus lowering the minimum discernable signal at each cell of the array, and raising the dynamic range of this sensor.

The resulting voltage signal is thus equal to the signal change divided by the row capacitance. The column electrode control circuitry is so organized that the signal change from only one pixel is under the row electrode at any one time, so that the signal charge at a particular pixel P is transferred out from under the row electrode at the same time that the signal charge at the next pixel (P+1) is transferred under the row electrode. In this manner, a continuous video signal voltage is assembled on all row electrodes. The continuous video from one line, delayed in delay means 40, is provided to the output amplifier at the same time that the fixed pattern noise voltage, from the previously read line, is provided to amplifier 42, so that the well-known reduction of fixed pattern noise can be implemented.

While a presently preferred embodiment of my novel CID image sensor with a preamplifier for each sensing array row has been illustrated in considerable detail herein, many variations and modification will now become apparent to those skilled in the art. It is my intent, therefore, to be limited only by the scope of the appending claims, and not by the specific details and instrumentalities presented by way of explanation of the preferred embodiment herein.

What I claim is:

1. A charge-injection-device (CID) image sensor having increased incident-photon-flux sensitivity and dynamic range, comprising:
  a two-dimension array of cells, each for temporarily storing electrical charge responsive to the magnitude of photon flux incident upon that cell, the array arranged in a plurality m of rows each having a plurality n of cells arranged in n columns;
  peripheral electronics means for (a) first resetting all cells along a just-previously read one of the plurality m of rows in the array and (b) then providing at least one row selection signal to cause, according to a selected sequence, each of the cells along a next row of the array to generate a row voltage signal of magnitude responsive to the intensity of photon flux having fallen on that cell after the last reset thereof;
  video amplifier means for providing an output video signal responsive to at least one preamplified signal; and
  a plurality n of voltage preamplifier means each coupled to only one associated row for amplifying the row signal therefrom, only when the cells along that row are being scanned, to provide the at least one preamplified signal to said video amplifier means.

2. The sensor of claim 1, further comprising at least one impedance element each coupled in parallel to at least a portion of the plurality of preamplifier means and across each of which impedance element an associated one of the at least one preamplified signal is formed.

3. The sensor of claim 2, wherein each preamplifier means comprises: a first device having a control electrode receiving the associated row signal and a circuit in which a signal current flows with magnitude responsive to the signal magnitude at the control electrode; and a switching device having a control electrode receiving the row selection signal and a circuit in which the first device current flow to the associated impedance element, to generate the associated preamplified signal, only when the control electrode receives the selection signal for that row being scanned.

4. The sensor of claim 3, wherein each of the at least one impedance element is a load resistance.

5. The sensor of claim 4, further comprising capacitive means for coupling the video signal separately from each of the at least one resistance element without affecting the DC voltages thereacross.

6. The sensor of claim 3, further comprising common means connected to the signal current flow circuit of all of the preamplifying means first devices for providing a bias voltage to the first devices.

7. The sensor of claim 6, wherein the bias means includes a bias resistance.

8. The sensor of claim 7, wherein the bias means also includes a bypass capacitance in parallel with said bias resistance.

9. The sensor of claim 8, wherein each of the at least one impedance element is a load resistance.

10. The sensor of claim 9, wherein each of a pair of load resistance is coupled in parallel to a selected different portion of the plurality of preamplifier means, an associated one of a pair of preamplified signals being formed across each load resistance.

11. The sensor of claim 10, wherein all of the preamplifier means associated with the odd-numbered rows of the array are coupled to one of load resistances, and all of the preamplifier means associated with the even-numbered rows of the array are coupled to the other load resistances.

12. The sensor of claim 11, further comprising capacitive means for coupling the video signal from each of the resistance elements without affecting the DC voltages thereacross.

* * * * *